(12) United States Patent
Bangert et al.

(10) Patent No.: US 7,837,799 B2
(45) Date of Patent: Nov. 23, 2010

(54) ARRANGEMENT FOR TRANSPORTING A FLAT SUBSTRATE IN A VACUUM CHAMBER

(75) Inventors: Stefan Bangert, Steinau (DE); Frank Fuchs, Geiselbach-Ommersbach (DE); Uwe Schuessler, Aschaffenburg (DE); Ralph Lindenberg, Schoeneck (DE); Tobias Stolley, Hanau (DE)

(73) Assignee: Applied Materials GmbH & Co. KG, Alzenau (DE)

( * ) Notice: Subject to any disclaimer, the term of this patent is extended or adjusted under 35 U.S.C. 154(b) by 288 days.

(21) Appl. No.: 10/732,179

(22) Filed: Dec. 10, 2003

(65) Prior Publication Data
US 2005/0199493 A1 Sep. 15, 2005

(30) Foreign Application Priority Data
Apr. 30, 2003 (DE) ................ 103 19 379

(51) Int. Cl.
*C23C 16/00* (2006.01)
*C23C 14/00* (2006.01)
*C23F 1/00* (2006.01)
*H01L 21/306* (2006.01)
*C25B 11/00* (2006.01)
*C25B 13/00* (2006.01)

(52) U.S. Cl. .......... 118/729; 118/728; 156/345.22; 156/345.31; 156/345.51; 156/345.54; 414/939; 204/298.23; 204/298.25

(58) Field of Classification Search ........... 118/719, 118/718, 723, 728, 729; 156/345.51, 345.31, 156/345.32; 204/298.23, 298.24, 298.25; 414/935–941
See application file for complete search history.

(56) References Cited

U.S. PATENT DOCUMENTS 4,081,201 A 3/1978 Hassan et al.

(Continued)

FOREIGN PATENT DOCUMENTS

DE 27 54 228 7/1978

(Continued)

OTHER PUBLICATIONS

Patent Abstracts of Japan, No. 21, Aug. 3, 2001.

(Continued)

*Primary Examiner*—Parviz Hassanzadeh
*Assistant Examiner*—Rakesh Dhingra
(74) *Attorney, Agent, or Firm*—Fulbright & Jaworski L.L.P.

(57) ABSTRACT

An arrangement for transporting a flat substrate through a coating installation, wherein the coating installation comprises, e.g., several and different sputter cathodes, to which the flat substrate, for example a glass pane, is transported one after the other in vacuo. So that no abrasion is generated between glass pane and contact, the glass pane is kept spaced apart from the contact by means of gas pressure. The gas pressure is herein built up through relatively few and small holes in a gas channel. Since during flooding of the coating installation to atmospheric pressure or during evacuation, due to the small holes, no fast pressure equalization between gas channel and the remaining coating installation is possible, the gas channel is decoupled in terms of gas from the remaining coating installation and provided with a separate gas line, via which gas can be introduced into the gas channel or pumped out of it.

27 Claims, 6 Drawing Sheets

U.S. PATENT DOCUMENTS

| | | | | |
|---|---|---|---|---|
| 4,299,518 | A | * | 11/1981 | Whelan .................. 406/62 |
| 4,392,915 | A | * | 7/1983 | Zajac ..................... 438/716 |
| 4,690,591 | A | * | 9/1987 | Nagashima et al. ........... 406/88 |
| 4,738,748 | A | | 4/1988 | Kisa |
| 4,749,465 | A | * | 6/1988 | Flint et al. ............. 204/298.25 |
| 4,865,491 | A | * | 9/1989 | Sakurai .................. 406/87 |
| 5,027,941 | A | | 7/1991 | Lenhardt |
| 5,133,284 | A | * | 7/1992 | Thomas et al. ............. 118/719 |
| 5,139,459 | A | * | 8/1992 | Takahashi et al. ........... 454/187 |
| 5,180,000 | A | | 1/1993 | Wagner et al. |
| 5,494,522 | A | * | 2/1996 | Moriya et al. .............. 118/719 |
| 5,820,329 | A | * | 10/1998 | Derbinski et al. ...... 414/225.01 |
| 6,017,396 | A | | 1/2000 | Okamoto |
| 6,240,610 | B1 | * | 6/2001 | Ishihara et al. ............. 29/25.01 |
| 6,336,775 | B1 | | 1/2002 | Morita et al. |
| 6,359,686 | B1 | * | 3/2002 | Ariglio et al. ............ 356/239.1 |
| 2002/0012749 | A1 | * | 1/2002 | von Campe et al. ......... 427/314 |
| 2003/0037456 | A1 | * | 2/2003 | Hunter et al. ................. 34/230 |

FOREIGN PATENT DOCUMENTS

| | | |
|---|---|---|
| DE | 39 43 482 A1 | 11/1990 |
| DE | 196 20 234 A1 | 11/1997 |
| EP | 0 020 982 A2 | 1/1981 |
| JP | 58-207217 | 12/1983 |
| JP | 60-74626 | 4/1985 |
| JP | 2001-010724 A | 1/2001 |
| JP | 2001-1118907 A | 4/2001 |
| JP | 2001-213517 A | 8/2001 |
| JP | 2002308422 A | 10/2002 |

OTHER PUBLICATIONS

Patent Abstracts of Japan, No. 16, May 2001.
Patent Abstracts of Japan, No. 25, Apr. 12, 2001.
Vakuum Spanntechnik/Horst Witte Geratebau dated May 2002.
System of Manz automation AG (date unknown).
Manz Automation—Robots in Action (Aristo 500 S sputtering system).
Manz Automation in Action (Aristo 1200 ITO sputtering system).

* cited by examiner

ARRANGEMENT FOR TRANSPORTING A FLAT SUBSTRATE IN A VACUUM CHAMBER

FIELD OF THE INVENTION

The invention relates to an arrangement for transporting a flat substrate in a vacuum chamber.

BACKGROUND OF THE INVENTION

In inline vacuum coating installations the substrates to be coated are transported to several coating sources and are coated by these sources. For example, glass plates are conveyed in their horizontal position on transport belts or transport rollers. Since the substrates are only resting in contact on individual rollers, very thin glass panes can sag in the sections between the rollers. The reliable transport of the panes on such a system can consequently not be ensured. The substrates can also be transported in the vertical or nearly vertical position. In order to be able to hold them reliably in this position, they must be guided at their upper and lower edges. But on the guide rails of the transport system particles can be generated, which, depending on the quality requirements made of the coating, can lead to rejected items if such arrive on a substrate. This hazard develops especially through the upper guide rails of the transport system, since the particles with high probability fall from them onto the substrate.

It is known to secure or clamp work pieces under atmospheric pressure by disposing them on a porous sintered metal plate, on whose backside a vacuum is generated. Through the porous vacuum plates the work pieces become attached by suction and secured (Catalog "Vakuum Spanntechnik"/Horst Witte Gerätebau). In a known transport system flat substrates are placed onto porous sintered metal plates of this type and through the porous plate compressed air is blown from below, which forces the air to flow through the fine pores of the sintered metal plate. This makes the substrate hover on an air cushion (device by MANZ Automation).

Such transport systems cannot be utilized in vacuum. The enormous surface resulting from the porosity of the vacuum plate or the sintered metal plate adsorbs gas or water from the air if the vacuum installation is flooded. The adsorbed material is desorbed again in the subsequently established vacuum, whereby an additional and not controllable quantity of gas is introduced. This quantity of gas alone would be capable in the vacuum to allow a glass pane to be lifted. In addition, such a gas load also impairs reactive sputter processes, since the additional gas quantity flowing in under lack of control changes the ratio of reactive gas to inert gas and nonreactive coatings are contaminated by foreign atoms.

A transport system is furthermore known in which the substrates, for example CDs, hover on a gas cushion (CD production installation of Leybold AG, around 1990). In this system, which is applied under atmospheric pressure, the gas cushion is generated thereby that through bores in an approximately 120 mm wide and approximately 1 m long flat metal plate compressed air is blown from below against the CDs. These bores are spaced apart from one another at a distance of approximately 5 cm and are disposed in rows at a distance of approximately 5 cm. Some of the bores are not perpendicular, but rather are set in at an angle to the metal surface, which lends the blown-out air a component in the direction of transport and the CDs are moved forward. The bores have a diameter of somewhat less than 1 mm. In order to reduce the consumption of purified compressed air, individual sections of the transport path are continuously connected with a compressed air supply. Behind the CD the compressed air is subsequently switched off again in order to ensure that, on the one hand, the CD is moved without contacting the metal surface, but, on the other hand, nonrequired sections of the transport path do not unnecessarily waste compressed air.

This system can also not be utilized in vacuum, since the number and the cross section of the bores would cause too great a gas throughput. It has been found that, in contrast to transport systems operated under atmospheric pressure, the gas flow in a transport system operated in vacuo must be selected with much deliberation depending on the chamber pressure, since otherwise the glass pane can be excited into oscillation.

A work piece carrier for a pane-form work piece is already known, which is subjected to surface treatment, especially in a vacuum installation (DE 39 43 482). This work piece carrier comprises a work piece bearing surface with a multiplicity of exit openings communicating with a distribution volume. Connected to this distribution volume is a gas supply, which supplies a gas to form a heat-transferring gas cushion between bearing surface and work piece. The distribution volume is formed by a groove, which is worked into a plate and covered by a cover plate. In addition to the exit openings in the bearing surface, a multiplicity of aspiration openings are provided, each of which extends next to the groove through the plate and cover plate and communicates with a gas aspiration volume to which a gas draw-off line is connected. The gas impinging onto the work piece in this case does not serve for the purpose of keeping the work piece away from a contact.

The invention is based on the task of providing a transport system for substrates to be coated, which can also be applied in a vacuum and in which no abrasion occurs on the substrates.

This task is solved according to the arrangement according to the present invention.

SUMMARY OF THE INVENTION

The invention relates to an arrangement for transporting a flat substrate through a coating installation. This coating installation comprises for example several and differing sputter cathodes, to which the flat substrate for example a glass pane, is transported in a vacuum one after the other. So that no abrasion is generated between glass pane and contact, the glass pane is kept at a spacing from the contact by means of gas pressure. The gas pressure is here built up through relatively few and small holes in a gas channel. Since during flooding of the coating installation to atmospheric pressure or during evacuation, due to the small holes, no rapid pressure equalization between the gas channel and the remaining coating installation is possible, the gas channel is decoupled in terms of gas from the remaining coating installation and provided with a separate gas line, via which gas can be introduced into the gas channel or pumped out of it.

The advantage attained with the invention comprises in particular that particle-free coating is possible for example of a glass pane in a vacuum. In addition, the attachment by suction and blowing-off of substrates during the ingress and egress through a lock is prevented.

An embodiment example of the invention is shown in the drawing and will be described in the following in greater detail.

Figure 1:
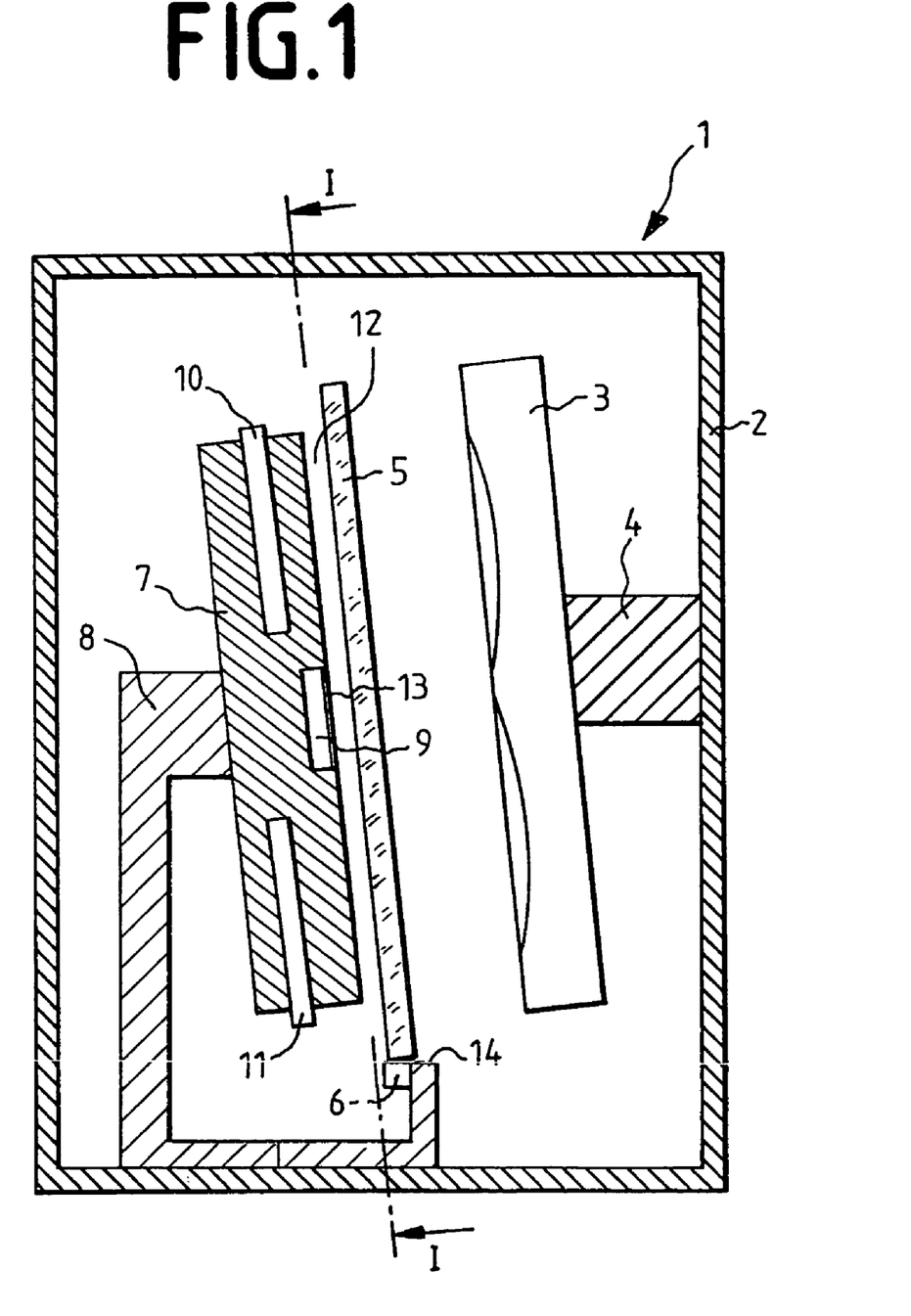
FIG. 1 is a sectional side view of a process chamber with a gas system.

In FIG. 1 a vacuum process chamber 1 is shown in longitudinal section. In a housing 2 is disposed a sputter cathode 3 connected via a mounting 4 with the housing 2.

DETAILED DESCRIPTION

At a distance spaced apart from the sputter cathode 3 is disposed a glass pane 5 to be coated, which assumes an angle of approximately 85 degrees with respect to the horizontal plane. At its lower edge the glass pane 5 is in contact on transport rollers 6, which move the glass pane 5 into the plane of drawing, for example to a second sputter cathode.

Behind the glass pane 5 is disposed a gas system 7, which maintains the glass pane 5 in suspension during the transport spaced apart from the gas system 7. This gas system 7 is held in a slightly oblique position by means of a mounting 8 connected to housing 2. In the gas system 7 opposite the glass pane 5 a gas channel 9 is provided which, via not shown supply lines, is connected to a gas source. In the gas system 7 electric heating cartridges 10, 11 can be integrated. Between the gas system 7 and the glass pane 5 is a gap 12, which is a quasi air cushion, on which rests the glass pane 5.

The gas channel 9 is closed toward the glass pane 5 with a plate 13, in which are several bores of, for example, a diameter of 0.2 mm. If the gas system 7 has an approximate width of 200 mm and the gas channel 9 a cross sectional area of a few $cm^2$, with bores of a diameter of 0.2 mm disposed in the center of the plate 13 at distances of 60 mm with respect to one another, a glass pane of 1100 mm length, 700 mm width and 0.7 mm thickness can be held spaced apart from gas system 7 with a gas throughput of approximately 20 sccm. The cross section of the gas channel 9 must be tuned to the total length of the gas system 7 such that at the necessary gas throughput for transporting the glass pane 5 at all exit openings the same flow conditions are present in order for the spacing of the glass pane 5 from the gas system 7 not to be subject to fluctuations.

The glass pane 5 can readily be displaced in oscillation in the vacuum, since the damping effect of the atmospheric pressure is absent.

The pressure difference between the front and backside of the glass pane 5 can be calculated from the flow resistance between the conductance for the gas flowing through the holes in plate 13. This flow resistance depends strongly on the width of gap 12. A very narrow gap 12 causes high resistance, while the flow resistance decreases with increasing width of gap 12. Since the glass pane 5 in the resting state is in contact on plate 13 and with increasing gas flow is lifted increasingly more, the flow resistance is initially high and subsequently falls off strongly. The very fine bores in plate 13, in contrast, have a nonvarying flow conductance which can be calculated from its cross section.

When the gas flow is switched on, initially the flow resistance of gap 12 predominates and the gas flow causes the lifting of the glass pane 5. With increasing distance the flow resistance in the gap decreases strongly and the gas flow is only limited by the flow resistance of the bores in plate 13. If through gap 12 more gas can escape than can be replenished by gas through the bores, the glass pane 5 falls back again onto plate 13 and the flow resistance in gap 12 increases again. The gas cushion builds up again and the gap 12 is again enlarged. Since this process is periodically repeated, the glass pane 5 can be displaced into oscillations.

The distance of the substrate 5 from the gas channel 9 consequently is self-regulating, i.e. so to say a free oscillator regulation is involved. It is understood that a conventional regulation can also be carried out, in which the distance of the substrate 5 from the gas channel 9 is measured and kept constant by variation of the gas flow.

That the ambient pressure in the process chamber 1 represents a damping parameter could be demonstrated experimentally. If at an ambient pressure of $10^{-4}$ mbar gas flowed at 17 sccm, the glass pane 5 started to oscillate. At a pressure of $10^{-2}$ mbar, at the same setting the glass pane could already be excited into oscillation. In order to match the gas flow for the transport system to the specific conditions in a vacuum installation, it must be regulated with a highly precise gas flow regulator and cannot, like in atmospheric systems, be operated in simple manner with a gas bottle or compressor whose gas flow is coarsely regulated.

Said oscillation behavior cannot be observed under atmospheric pressure, since the flow resistance in gap 12 increases drastically with increasing ambient pressure. Under atmospheric conditions the flow resistance of the gas flow in gap 12 is always higher than that caused by the bores. Not the conductance of the bores, but rather that of the gap 12 limits the gas flow under the atmospheric conditions. Consequently the preconditions for setting the glass pane 5 into oscillation under atmospheric conditions are absent.

In order to ensure the disturbance-free operation in vacuo, the gas channel 9 must have a small volume in order to ensure short reaction times during pressure change. On the other hand, the cross section must not be too small so that the gas can flow out of the bores over the entire length of the gas channel 9 with the same gas throughput.

Figure 2:
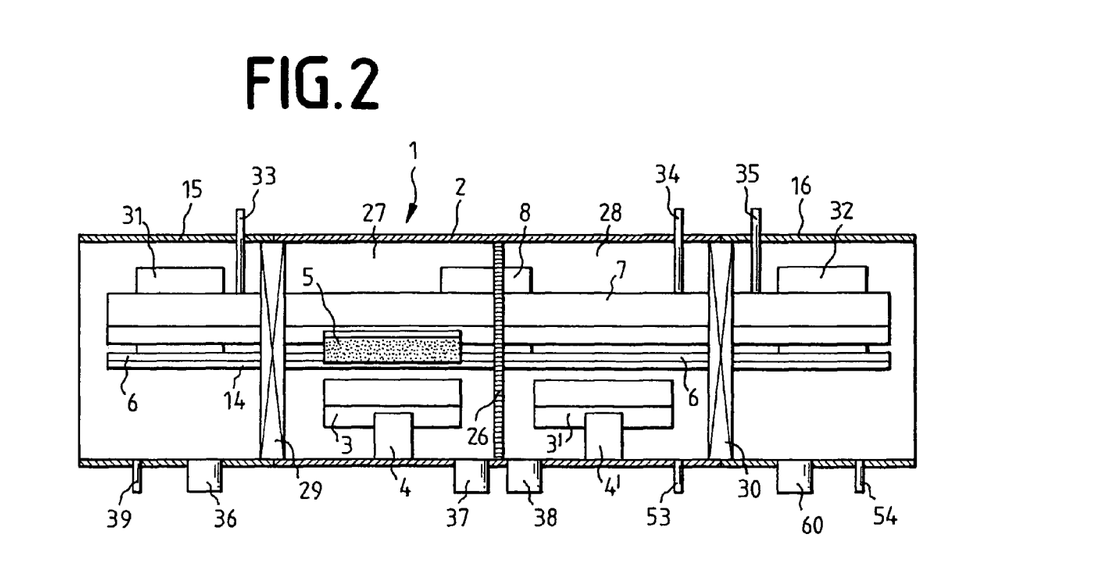
FIG. 2 is a top view onto a process chamber and two lock chambers.

In FIG. 2 the process chamber 1 with its housing 2 is shown in sectional view from above. The sputter cathode 3 with its mounting 4 as well as the support 14 for the roller drive 6 are evident. The glass pane 5 and the gas system 7 are also evident.

The process chamber 1 is divided into two regions 27, 28 by means of a chamber partition 26. In the region 28 a sputter cathode 3' with a mounting 4' is also provided. With the second sputter cathode 3', for example, a coating different than with the first can be carried out.

The transport of the glass pane 5, in the state in which it is lifted from plate 13, takes place between the two sputter cathodes 3, 3'.

The volume of the gas channel 9 must be decoupled with respect to gas from the process chamber 1 during flooding or evacuation. If only the process chamber 1 were to be evacuated, the gas in the gas channel 9 would flow slowly and over a long time through the small holes in plate 13. An analogous effect would occur during flooding. The gas decoupling can take place thereby that the holes during the flooding or evacuating are closed or that the gas channel 9 has its own gas supply line, via which the evacuation can also be carried out. While the flooding or evacuation of the gas channel 9 takes place spatially separate from the flooding and evacuation of the process chamber 1, however, it should take place synchronous in time so that the process chamber 1 and the gas channel 9 are simultaneously completely evacuated or flooded. This prevents said oscillation behavior of the glass pane 5 as well as the attaching through suction to the transport system or the uncontrolled lifting of the glass pane.

The glass pane 5 as a rule is only kept in suspension during the transport but not during the coating process proper. The transport takes place in the vacuum and specifically from one sputter cathode to the next. However, it is also possible to move the glass pane 5 continuously. But the transport in the hovering state can also take place when the glass pane 5 ingresses and egresses through the lock.

Furthermore, through the installation of an additional valve-driven gas exit opening on the gas system 7 in the region outside of the bearing surface of the substrate 5, for example on the upper or lower side, it is also possible to supply the transport gas to the process chamber as process gas without lifting the substrate from the transport system.

It is also possible to utilize the transport gas for the conditioning of the process gas atmosphere. For this purpose the lock chamber 15, 107 is evacuated to a vacuum pressure below that of the process chamber. With the supply of the transport gas identical with the process gas, the lock chamber 15, 107 is filled to the pressure level of the process chamber. This prevents that through the process of moving the substrate through the lock gas, components of the ambient atmosphere are introduced into the process chamber to a disturbing degree.

As is evident in FIG. 2, the gas system 7 extends across the process chamber 1 out onto lock chambers 15, 16. The section, disposed in the lock chamber 15, 16, of gas system 7 is subject to pressure fluctuations, which are caused by the flooding and evacuation of the lock chambers 15, 16. Between process chamber 1 and lock chambers 15, 16 are lock gates 29, 30. In the lock chambers 15, 16 are also provided mountings 31, 32 for the gas system 7. The process chamber 1 and the lock chambers 15, 16 have each separate connections 33, 34, 35 for flooding and separate pump ports 36, 37, 38, 60 for pumping as well as separate flood valves 39, 53, 54. Via a not shown valve system the connections 33, 34, 35 can optionally be connected with the flood valves 39, 53, 54 as well as also with the pumps 36, 37, 38, 60.

With the arrangement according to FIG. 2 two different installation types can be realized. The one installation type is an inline installation with dynamic coating of the substrates. In it the glass pane 5 during the coating moves continuously past the sputter cathodes 3, 3'.

The other installation type permits static coating. The glass pane 5 moves here from the lock chamber 15 into the process chamber 1 and is stopped in front of the sputter cathode 3. After the coating has been completed, the glass pane 5 is either moved into the next compartment 28 or into the lock chamber 16.

The glass pane 5 can be attached by suction if the removal lock chamber 16 is flooded but a very much lower pressure obtains in the gas channel 9. The pressure equalization via the fine bores takes place too slowly, such that the gas channel 9 must be flooded via the separate connections 33, 34, 35 with greater cross section in order to be able to remove the glass pane without time delay.

The converse effect is obtained if the glass pane 5 had been set into the loading lock 15 and this lock chamber 15 is evacuated. The gas channel 9 is still under atmospheric pressure, such that the gas in it would flow without control into the process chamber 1. The consequence would be that the glass pane 5 in the process chamber would be lifted without control or would come into oscillation. This would damage the glass pane 5.

In order to avoid this, the gas channel 9 is evacuated and flooded according to the invention separately but simultaneously with the lock chambers 15, 16.

Figure 3:
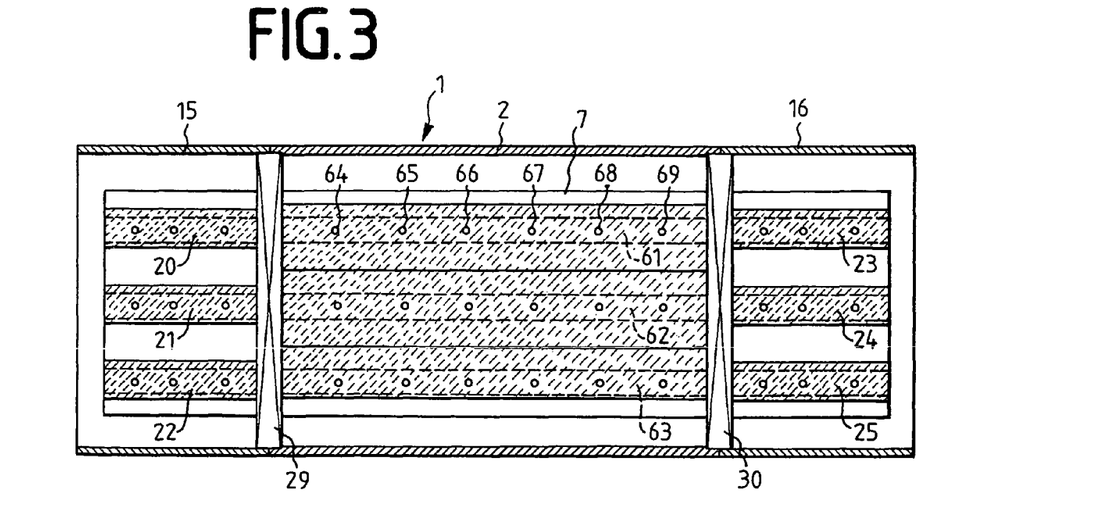
FIG. 3 is a front view of process chamber and lock chamber.

FIG. 3 shows a section I-I (cf. FIG. 1) through vacuum chamber 1 and the lock chambers 15, 16, which depicts a preferred embodiment.

In this embodiment in the process chamber 1 is provided an areally solid gas system 7 with three gas channels 61, 62, 63 comprising several throughbores 64 to 69, while in lock chambers 15, 16 in each instance three bar-form gas systems 20 to 22 and 23 to 25, respectively, are provided with open regions between them. But the proposed transport system is not limited to this number of gas systems 20 to 22 and 23 to 25, respectively, but rather its number can be adapted to the dimensions of the glass panes to be transported. In FIG. 3 the throughbores 64 to 69 are shown significantly larger than they are in reality. Each of these gas systems 20 to 22 and 23 to 25, respectively, has a gas channel. In lock chambers 15, 16 three gas systems 20 to 22; 23 to 25 are each provided with one gas channel, such that, for example, the grippers or suction apparatus of any loading or unloading arrangement can extend between the gas systems 20 to 22 and 23 to 25, respectively. But, a movable atmospheric transport system of the above described type can also be utilized, which, in turn, reaches with bar-form gas systems into the described open regions and to which the substrate is delivered.

In the case of a divided support through the separate gas systems, a necessary pressure for levitation with a flat substrate of specific dimensions is calculated as follows:

| Areal support in strip form | 10% | | |
|---|---|---|---|
| Number of strips | 3 | | |
| Length | 1 m | | |
| Width | 1 m | | |
| Thickness | 0.7 mm | | |
| Density | 2760 kg/m$^3$ | | |
| Area | 1 m$^2$ | | |
| Volume | 7.00E−04 m$^3$ | | |
| Mass | 1.932 kg | | |
| g | 9.81 m/(s$^2$) | | |
| Weight | 18.9529 N | | |
| Weight per strip | 6.3176 N | | |
| Pressure behind strip | 189.5292 N/m$^2$ (Pa) | | |
| | 1.8953 mbar | | |
| Inclined plane | | | |
| Gradient angle | 85 degrees | | |
| Normal force | 1.652 | 8.72% | |
| Slope drift-off force | 18.881 | 99.62% | |
| Necessary pressure for compensation of normal force | 16.519 1.65E−01 | N/m$^2$ (Pa) mbar | |
| Virtual gap | | | |
| Periphery | 6 m | width | 0.033 m |
| Depth (approx. 10%) | 0.0033 m | | |
| Lifting gas flow | 1400 sccm | | |
| | 23.33 mbarl/s | | |
| Necessary max. conductance for horizontal levitation | 12.31 l/s | flight altitude | 0.125 mm |
| inclined plane | 141.26 l/s | flight altitude | 0.5 mm |

-continued

| | | | |
|---|---|---|---|
| Lifting gas flow | 1000 sccm | | |
| | 16.67 mbarl/s | | |
| Necessary max. conductance for horizontal levitation | 8.79 l/s | flight altitude | 0.1 mm |
| inclined plane | 100.90 l/s | flight altitude | 0.4 mm |
| Lifting gas flow | 500 sccm | | |
| | 8.33 mbarl/s | | |
| Necessary max. conductance for horizontal levitation | 4.40 l/s | flight altitude | 0.07 mm |
| inclined plane | 50.45 l/s | flight altitude | 0.3 mm |

In the process chamber 1 the support surface of the transport system is extended gap free over the entire surface of the glass pane 5, since it is intended to fulfill two tasks. For one, it represents the surface which protects the glass pane from the back via the gas cushion. This is also necessary since the glass panes for a TFT production are very thin, for example 0.7 mm and, with only partial support can sag in some areas, which leads to nonuniform coating. For another, the full surface of the transport system is to serve as a heating surface and heat the glass pane 5 uniformly. The heating herein takes place by means of electric heating cartridges 10, 11.

With solid areal support of the glass pane, for a specific pane the following values apply:

| | | |
|---|---|---|
| Length | 1 m | |
| Width | 1 m | |
| Thickness | 0.7 mm | |
| Density | 2760 kg/m$^3$ | |
| Area | 1 m$^2$ | |
| Volume | 7.00E−04 m$^3$ | |
| Mass | 1.932 kg | |
| g | 9.81 m/(s$^2$) | |
| Weight | 18.9529 N | |
| Pressure | 18.9529 N/m$^2$ (Pa) | |
| | 0.1895 mbar | |
| Inclined plane | | |
| Gradient angle | 85 degrees | |
| Normal force | 1.652 | 8.72% |
| Slope drift-off force | 18.881 | 99.62% |
| Necessary pressure for compensation of normal force | 1.652 | N/m$^2$ (Pa) |
| | 1.65E−02 | mbar |
| Virtual gap | | |
| Periphery | 4 m | width |
| Depth (approx. 10%) | 0.1 m | |
| Lifting gas flow | 100 sccm | |
| | 1.67 mbarl/s | |
| Necessary max. conductance for horizontal levitation | 8.79 l/s | flight altitude | 0.6 mm |
| inclined plane | 100.90 l/s | flight altitude | 2.4 mm |
| Lifting gas flow | 30 sccm | |
| | 0.50 mbarl/s | |
| Necessary max. conductance for horizontal levitation | 2.64 l/s | flight altitude | 0.3 mm |
| inclined plane | 30.27 l/s | flight altitude | 1.2 mm |
| Lifting gas flow | 10 sccm | |
| | 0.17 mbarl/s | |
| Necessary max. conductance for horizontal levitation | 0.88 l/s | flight altitude | 0.165 mm |
| inclined plane | 10.09 l/s | flight altitude | 0.65 mm |

The above described virtual gap is a computer model to determine by computation the flow conditions of the gas flow between pane and base. The real conductance is found from an areal gap which is delimited on the inside by a circular line and on the outside by a rectangular line. Since this real situation cannot be simply determined mathematically, it was assumed that the entire flow resistance is in a rectangular gap, which is formed by the peripheral line of the glass pane and the distance between the pane and the base.

Behind the expression "the necessary maximum conductance for horizontal levitation" stands the fact that the substrate is disposed horizontally on the transport system and therefore the entire weight G must be introduced by the gas pressure p, in order to lift the pane. The physical relationships are here:

pressure p=force G per area A. If the substrate were disposed at an angle of incidence α with respect to the horizontal plane, the force component, which must be produced by the gas pressure, would decrease with the cosine of the angle of incidence, since in this case F=G*cos α would apply. With a perpendicular position, i.e. α=90°, the force component, which acts onto the transport system, is equal to zero, i.e. the weight of the pane rests only on the transport rollers.

For pressure p stands in the gas transport system the pressure difference $\Delta p$ between the pressure on the pane underside $p_1$ and ambient pressure $p_2$: $\Delta p = p_1 - p_2$. The pressure difference $\Delta p$ is related to the gas flow $\Phi$ and the conductance L: $\Phi = L*\Delta p$ or $\Delta p = \Phi/L$. The maximum conductance specifies the minimum pressure difference $\Delta p_m$, which is just necessary to lift the pane ($\Delta p_m = G/A$), and consequently represents the limit conductance.

The support surface of the transport system can be provided over its extent in sections with separate gas connections, in order to be able to adapt it to glasses of different extent. Gas channels not required are in this case evacuated to the installation pressure in order to avoid unnecessary gas ballast.

Figure 4:
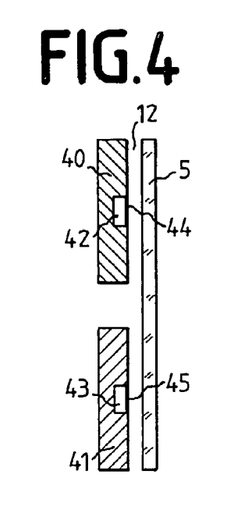
FIG. 4 shows two separate gas channels opposite a glass pane.

FIG. 4 shows a first variant of a gas system in which two gas systems 40, 41 are disposed one above the other, of which each gas system 40, 41 comprises a gas channel 42, 43. In a wall 44 or 45 of these gas channels bores having a diameter of approximately 0.2 mm are provided through which gas can flow against the glass plate 5. Between the glass plate 5 and the gas systems 40, 41 is located a gap 12.

Figure 5:
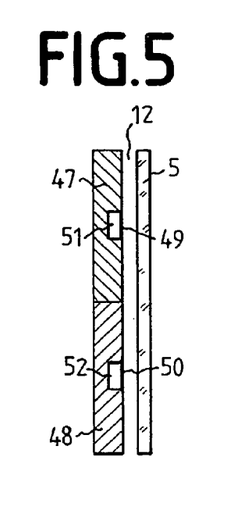
FIG. 5 shows two segmented gas channels forming a solid area.

Another variant of a gas system is shown in FIG. 5. Here no gap is provided between the gas systems 47, 48, but rather the two gas systems 47, 48 form an areally solid plate, which however is segmented. The bores in walls 49, 50 of gas channels 51, 52 have also a diameter of 0.2 mm.

Figures 6, 7:
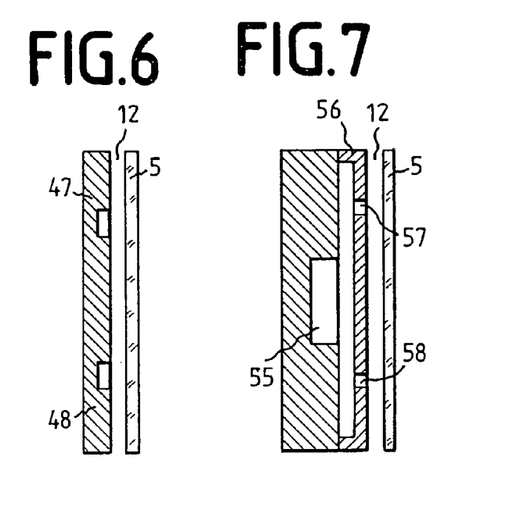
FIG. 6 shows two single-part gas channels.
FIG. 7 shows gas channel with baffle plate.

The embodiment of FIG. 6 differs from the embodiment of FIG. 5 only thereby that the gas systems 47, 48 are not segmented.

In FIG. 7 is shown a gas system 55 with a baffle plate 56 with larger gas distributor bores 57, 58. Bores 57, 58 here have a diameter of approximately 2 to 3 mm.

It is understood that the version of FIG. 7 can otherwise be arranged like the versions of FIG. 4 to 6, thus as individual gas channels, as a solid area, composed of several gas channels, or as a single-part version.

Figure 8:
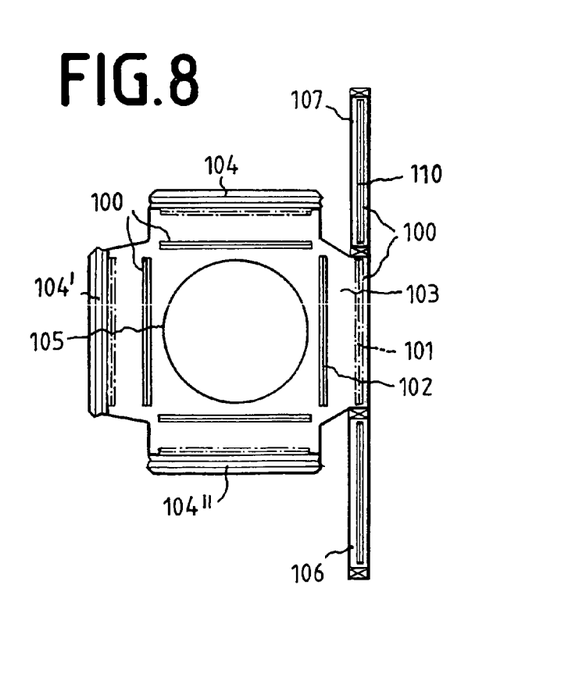
FIG. 8 is an inline installation with linearly movable and rotatable support.

In FIG. 8 a preferred embodiment of a coating installation with four stations is shown. In this installation the substrate 100 to be coated is brought into an ingress lock chamber 107 and moved to a delivery chamber 103. The gas system 110 is here movably supported and is in position 101, so that the substrate 100 can be received. When the substrate 100 has reached the correct position on the gas system, the gas system is brought into a position 102. Now a rotatable frame which carries the movable gas system can be rotated about the axis projecting out of the plane of drawing. During these processes the substrate 100 does not move on the gas system 110, it maintains its position. In this way substrates can be moved in through the lock quasi continuously, be transported to the process chamber 104', 104 and be coated before they reach the delivery chamber 103 again and are moved out via the egress lock chamber 106.

Figure 8A:
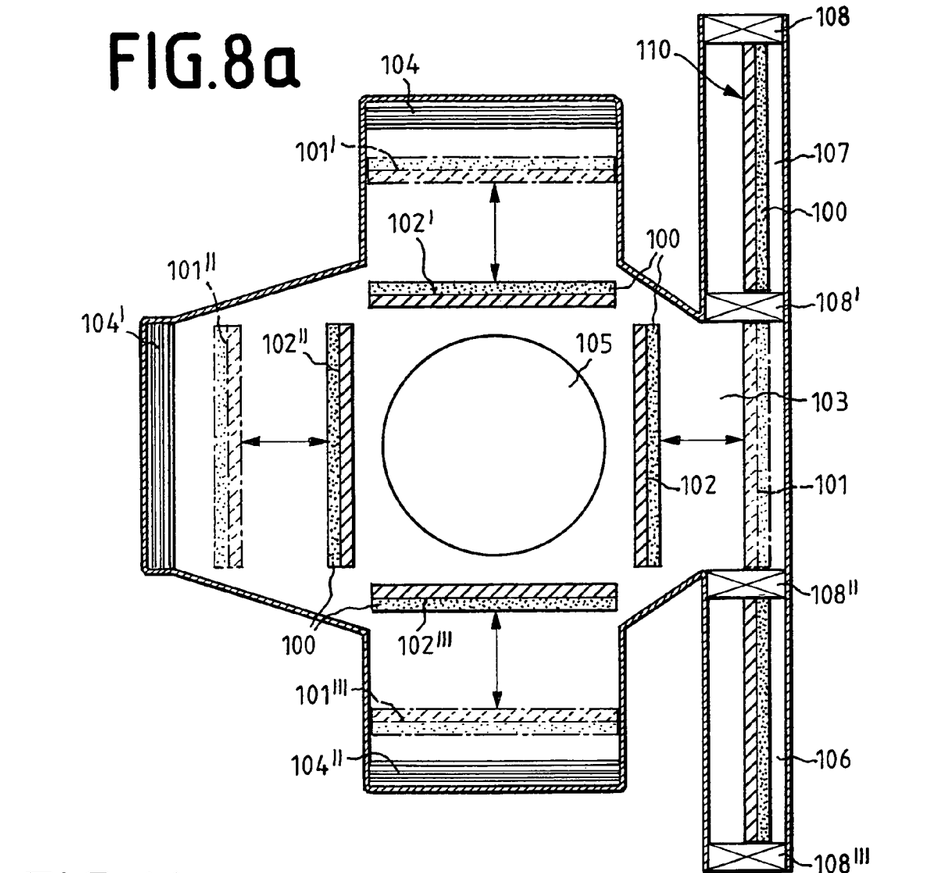
FIG. 8a is an enlarged representation of the inline installation according to FIG. 8.

In FIG. 8*a* the arrangement of FIG. 8 with several coating stations is shown once again at an enlarged scale and with more detailed specifications. In conjunction with this FIG. 8*a*, the operational function of the arrangement will be described.

The substrate is first brought at atmospheric pressure into an ingress lock chamber 107 with the lock gate 108 open and the lock gate 108' closed. After closing lock gate 108, the ingress lock chamber 107 is pumped down, thus is evacuated.

After pumping down the ingress lock chamber 107, the lock gate 108' is opened and the substrate 100 transported into the delivery chamber 103, in which the movable transport system is in a first position 101. During the transport in vacuo from the ingress lock chamber 107 to the delivery chamber 103, the substrate 100 is moved in the manner according to the invention, i.e. it does not rest in contact on an object through which particles can be abraded. The delivery chamber 103 is similar to the chamber depicted in FIG. 10, but with the cathode 3 missing, and the glass pane 5 and the transport system 7 being disposed in mirror-reverse. The lock gate 108' is subsequently closed again and the substrate now rests on the transport system in the first position 101. The transport system is now moved into a second position 102. The translational movement occurs simultaneously in all four process stations 104, 104', 104". While in the delivery chamber 103 the substrate is taken over by the extended transport system, at process stations 104, 104' and 104" further substrates are being treated. During the coating processes in the process stations 104, 104', 104" in the delivery chamber 103 one substrate each is conveyed into the egress lock chamber 106, and subsequently a further substrate is moved from the ingress lock chamber onto the transport system into the first position 101, with the transport system dwelling in the first position. When all coating processes as well as the ingress and egress of the substrates through the lock have been completed, the transport systems with the substrates are retracted from the first positions 101, 101', 101" and 101''' and reach the second positions 102, 102', 102" and 102'''. Now the rotating arrangement 105 can rotate all substrates on their transport systems by 90°, and the process steps start again at the beginning.

The egress through the lock of a coated substrate takes place analogously to the ingress through the lock.

The lock gates 108" and 108''' are closed, the egress lock chamber 106 is evacuated. Subsequently the lock gate 108" is opened and the substrate moved from the evacuated delivery chamber 103 into the evacuated egress lock chamber 106. The lock gate 108" is subsequently closed and, after the egress lock chamber 106 is flooded, the lock gate 108''' is opened. The transport from the delivery chamber 103 into the evacuated egress lock chamber 106 again takes place in the manner according to the invention, i.e. the coated glass pane is not in contact on the transport system.

The time required for the overall process is composed as follows: 3 seconds to move the rotating arrangement 105 into the starting position, 4 seconds to rotate the rotating arrangement 105 by 90°, 3 seconds to move the rotating arrangement 105 into the process position, 50 seconds for the sputter process, 2 seconds to open the inner valve, 6 seconds for the transport of the substrates, 2 seconds for closing the inner valve, 10 seconds for venting, 2 seconds for opening the outer valve, 6 seconds for the transport of the substrates, 2 seconds for closing the outer valve, 30 seconds for pumping.

Figure 9:
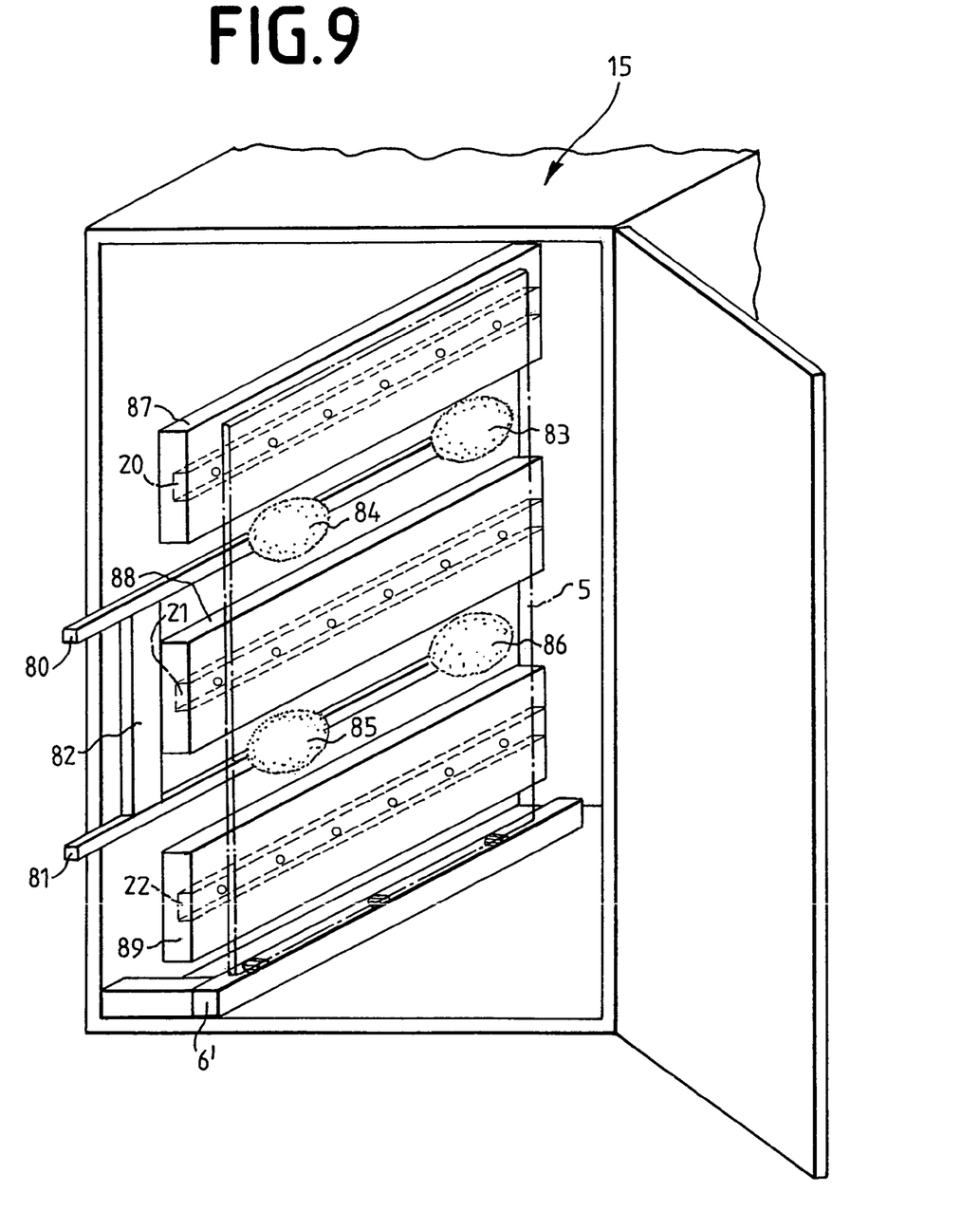
FIG. 9 is perspective view of a lock chamber of a gas system.

FIG. 9 depicts the lock chamber 15 in perspective view. The lock chamber 16 is structured correspondingly. The suction apparatus 83 to 85 are evident, which hold the glass pane 5 on its back side for loading or unloading. These suction apparatus 83 to 85 are fastened on a gripper arm, composed of elements 80 to 82 and being part of a not shown transport system on the ambient atmosphere side.

Figure 10:
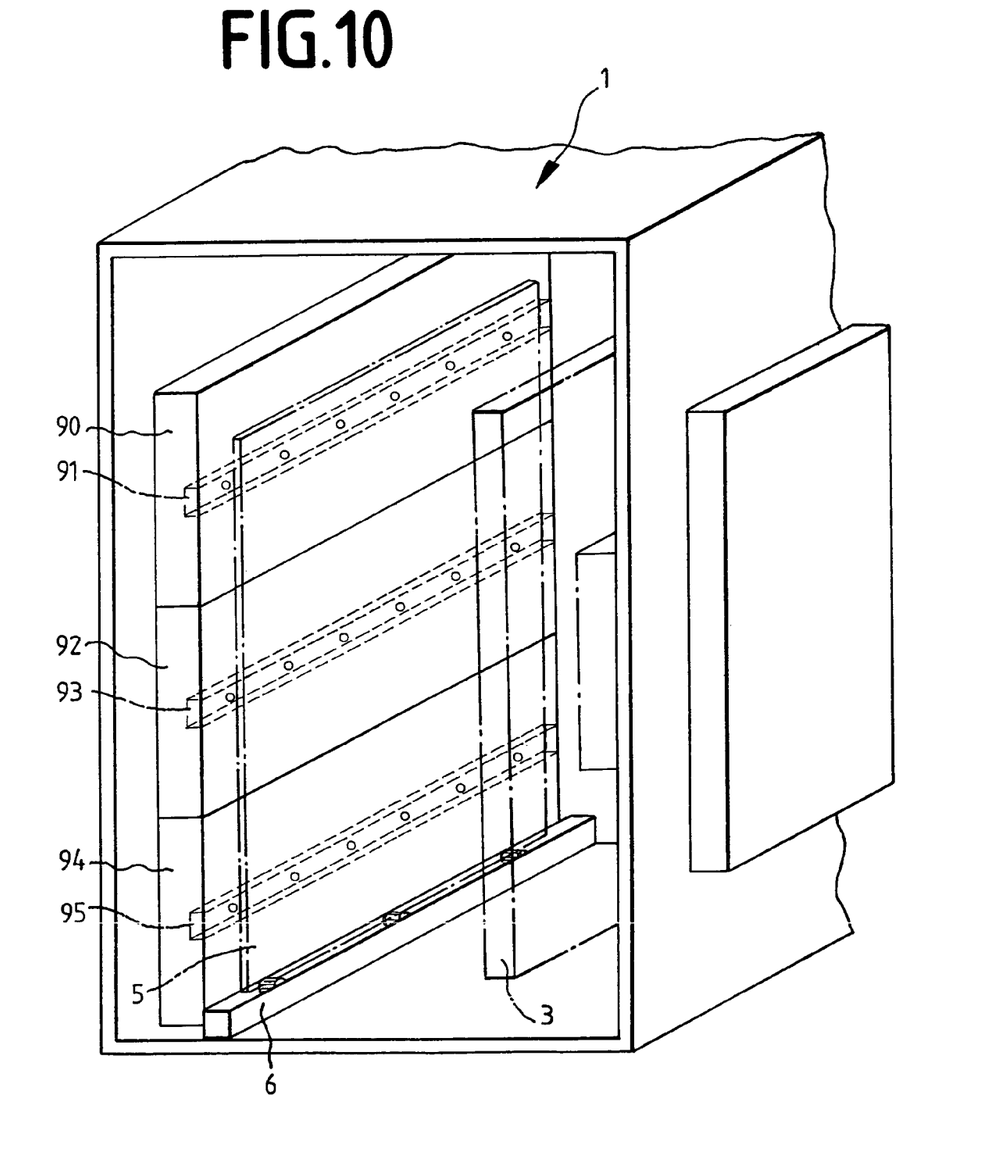
FIG. 10 is a perspective view of a process chamber.

FIG. 10 depicts the process chamber 1 in perspective view. A gas system comprised of parts 90, 92, 93 is evident, with each part being provided with a gas channel 91, 93, 95.

Figure 11:
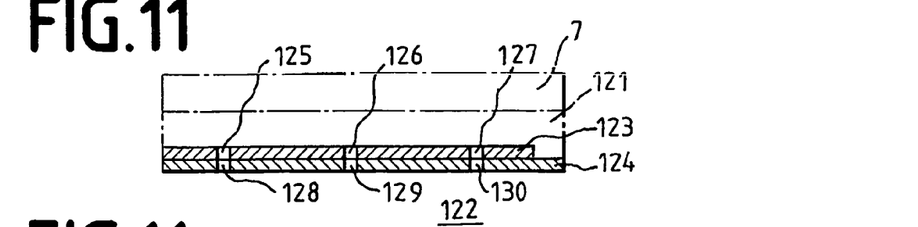
FIG. 11 is alternative gas decoupling in the open state.

FIG. 11 depicts a further capability for the separation in terms of gas of a gas channel 121 from a vacuum chamber 122 or another volume. Here two walls 123, 124, movable relative to one another, are provided comprising holes 125 to 127 and 128 to 130, respectively.

In FIG. 11 the holes 125 to 127 and 128 to 130, respectively, are disposed one above the other, such that gas can penetrate through walls 123, 124.

Figure 11A:
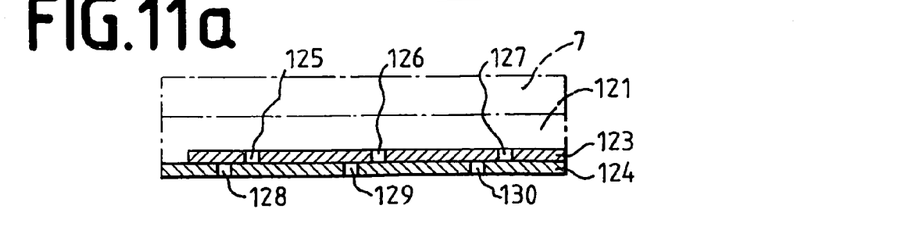
FIG. 11a is alternative gas decoupling of FIG. 11 in the closed state.

In the arrangement according to FIG. 11*a*, the holes 125 to 127 and 128 to 130 are no longer disposed one above the other, such that no gas can penetrate from gas channel 121 into the vacuum chamber 122 or conversely. Thereby a decoupling between gas channel 121 and vacuum chamber takes place. To be able to fill the gas channel rapidly with gas or to evacuate it, it must be provided with a separate gas line.

In a further, not shown, embodiment according to the invention of the transport system 7 the different bores 64 to 69 are opened or closed through simultaneously controlled valves.

It is claimed:

1. A transport system for transporting a flat substrate in a vacuum chamber having a process chamber and at least one lock chamber, comprising:
    a gas system comprising a gas channel having holes therein in a direction of the flat substrate for maintaining the substrate in suspension on an air cushion, the substrate being spaced apart from the gas system during transport in the at least one lock chamber;
    a gas supply system for supplying a gas in the at least one lock chamber;
    decoupling means for decoupling the gas channel with respect to gas from the at least one lock chamber resulting from evacuating or venting the at least one lock chamber; and
    a transport device for transporting the substrate substantially in parallel with respect to the gas system;
    wherein said transport device is in contact with an edge of the flat substrate.

2. A transport system as claimed in claim 1, wherein said gas channel comprises at least one of its own flooding lines, via which gas can be introduced into the gas channel and aspirated from it.

3. A transport system as claimed in claim 1, wherein said holes of the gas channel facing the substrate can be opened or closed simultaneously.

4. A transport system as claimed in claim 1, wherein the vacuum chamber comprises its own flooding line.

5. A transport system as claimed in claim 1, wherein the at least one lock chamber is a load lock chamber or an unload lock chamber.

6. A transport system as claimed in claim 5, wherein several gas channels, spaced apart from one another, are provided in the at least one lock chamber.

7. A transport system as claimed in claim 6, wherein each of the gas channels has a respective gas flooding line.

8. A transport system as claimed in claim 6, wherein a process chamber and the at least one lock chamber comprise pump ports which are connected to pumps.

9. A transport system as claimed in claim 1, wherein the substrate is oriented horizontally.

10. A transport system as claimed in claim 1, wherein the substrate is oriented at an angle of 85 degrees with respect to horizontal.

11. A transport system as claimed in claim 1, wherein several gas channels are provided across the extent of the substrate.

12. A transport system as claimed in claim 11, wherein the substrate is disposed at an angle of incidence of 4 degrees with respect to the horizontal.

13. A transport system as claimed in claim 12, comprising three gas channels.

14. A transport system as claimed in claim 1, wherein the gas is introduced all over the surface of the substrate.

15. A transport system as claimed in claim 1, wherein a gas inlet is provided to introduce transport gas.

16. A transport system as claimed in claim 1, wherein the flat substrate is opposite a sputter cathode.

17. A transport system as claimed in claim 16, wherein said sputter cathode is disposed in a process chamber which is adjoined by lock chambers.

18. A transport system as claimed in claim 17, wherein the process chamber and the at least one lock chamber comprise pump ports which are connected to pumps.

19. A transport system as claimed in claim 17, wherein a load lock chamber and an unload lock chamber are provided and that both lock chambers can be closed by two lock gates each, such that they are vacuum-tight.

20. A transport system as claimed in claim 1, wherein the flat substrate rests with an edge on transport rollers.

21. A transport system as claimed in claim 1, wherein several gas channels, integrated into an areally solid wall, are provided in the process chamber.

22. A transport system as claimed in claim 21, wherein each of the gas channels has a respective gas flooding line.

23. A transport system as claimed in claim 1, wherein several substrates can be transported simultaneously.

24. A transport system as claimed in claim 1, wherein the gas flow through the gas channels is precisely regulated.

25. A transport system as claimed in claim 1, wherein the transport gas is also utilized as process gas.

26. A transport system as claimed in claim 1, wherein the transport gas with the introduction of the substrate from the load lock chamber into the process chamber is utilized for conditioning the process gas atmosphere.

27. A lock chamber comprising a transport system for transporting a fiat substrate comprising:
a gas system comprising a gas channel having holes therein in a direction of the fiat substrate for maintaining the substrate in suspension on an air cushion, the substrate being spaced apart from the gas system during transport in the lock chamber;
a gas supply system for supplying a gas in the lock chamber;
decoupling means for decoupling the gas channel with respect to the gas from the lock chamber resulting from evacuating or venting the lock chamber; and
a transport device for transporting the substrate substantially in parallel with respect to the gas system, wherein said transport device is in contact with a lower edge of the fiat substrate.

* * * * *